Oct. 10, 1950  W. H. PECK  2,525,615
VALVE ASSEMBLY
Filed June 11, 1945
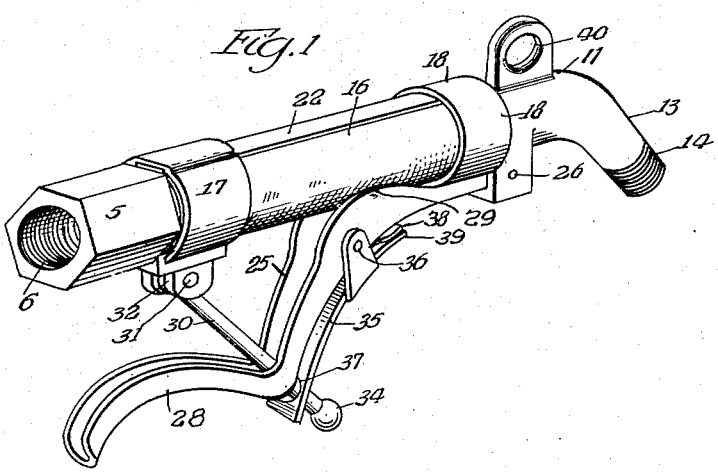
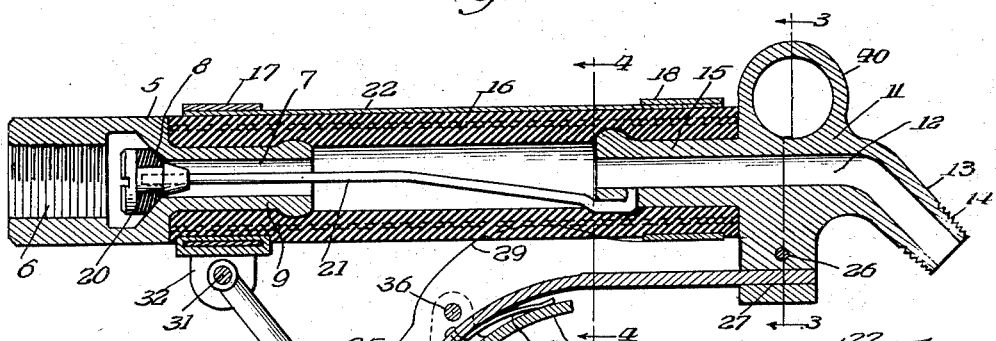
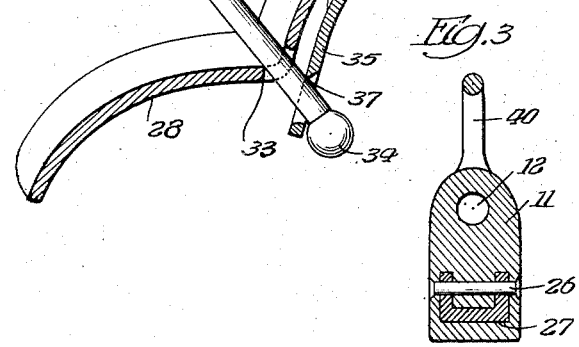
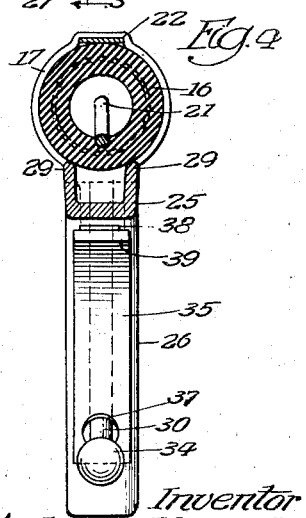
Inventor
William H. Peck
By Fred Gerlach his Atty.

Patented Oct. 10, 1950

2,525,615

UNITED STATES PATENT OFFICE 2,525,615

VALVE ASSEMBLY

William H. Peck, Tulsa, Okla., assignor to Flex-Rite Valve & Manufacturing Company, a copartnership composed of Ben Howell and Emil J. Thomas, both of Tulsa, Okla.

Application June 11, 1945, Serial No. 598,844

4 Claims. (Cl. 251—115)

The invention relates to valve assemblies.

One object of the invention is to provide an improved valve assembly which comprises an inlet casing-section or fitting, an outlet casing-section or fitting communicatively connected by a flexible tube, and a valve for controlling the flow of fluid through the assembly which is operable by bending or deflecting the flexible connecting tube to effect relative movement of the casing-sections.

Another object of the invention is to provide a valve of this type which includes a lever for bending or deflecting the flexible tube-section between the casing-sections, and means for locking the lever to hold the valve in its open position.

Other objects of the invention will appear from the detailed description.

The invention consists in the several features hereinafter defined by claims at the conclusion hereof.

In the drawings:

Fig. 1 is a perspective of a valve embodying the invention.

Fig. 2 is a longitudinal section.

Fig. 3 is a section taken on line 3—3 of Fig. 2.

Fig. 4 is a section taken on line 4—4 of Fig. 2.

The invention is exemplified in a valve assembly which comprises an inlet casing-section or fitting 5 which is provided with an internal screw-thread 6 for connection to a supply line or for a fluid, the flow of which is to be controlled. Section 5 is provided with a through duct 7, a valve-seat 8 and an integral nipple 9. The assembly also comprises an outlet casing-section or fitting 11 which is provided with a duct 12 extending therethrough, and an extension 13 which may be angular to serve as a discharge nozzle or may be provided with a screw-thread 14 for communicatively connecting the casing-section 11 to a line for the delivery of the fluid for use or application. Outlet section 11 is also provided with an integral nipple 15. A flexible tube-section 16, such as rubber hose, has one of its ends extending around and secured by a band 17 on the nipple 9 of the inlet casing-section and its other end extending around and secured by a band 18 on the nipple 15 of the discharge casing-section. A closure or valve-member 20 in the inlet section 5 is adapted to engage seat 8 and is secured, preferably by a screw-thread, to one end of a substantially rigid stem 21 which has its opposite end anchored in the nipple 15. The stem 21 extends through tube-section 16 and is provided with an angular end which is fixedly secured in nipple 15, to maintain said member in longitudinally fixed relation with casing-section 11. A flat resilient strip 22, for example, spring steel, extends longitudinally of the flexible tube-section 16 and has its ends secured to the casing-sections and the flexible tube-section by bands 17 and 18, respectively. The strip 22 lies on the top-side of and extends longitudinally of the tube-section 16 between the casing-sections and holds the upper portion of the tube-section 16, which underlies said strip, extended when the opposite or lower portion of said tube-section is deflected or bent inwardly or upwardly. When the lower portion of the flexible tube-section 16 or the portion opposite strip 22 is bent or deflected inwardly, there will be relative movement or angular displacement of the casing-sections which will decrease the distance between the valve-seat 8 and the portion of the discharge casing-section to which the stem 21 is secured and the distance between valve-member 20 and nipple 15 will remain substantially constant so that the valve-member 20 will be moved from its seat 9 a distance proportionate to the degree of bending or deflection of the lower portion of the flexible tube-section 16 and thus control the flow of fluid from the inlet casing-section 5 to outlet casing-section 11.

A lever 25 is adapted to band or deflect the lower portion of the flexible tube-section 16, and is channel shaped in cross-section and has its front end rigidly secured by a pin 26 in a socket 27 formed in a depending portion of casing-section 11. This lever is extended rearwardly and below the casing-section 5 and provided with a pistol-grip 28. By grasping the casing-section 5 and the pistol-grip 28 and squeezing them together, the lever 25 will bend or deflect the lower portion of the flexible tube-section 16 inwardly, while the strip 22 prevents elongation of the diametrically opposite portion of tube-section 16, and there will be angular deflection between the casing-sections to shorten the distance between the inner end of nipple 15 and valve-seat 8 while valve-member 20 is retained in its normally spaced relation from nipple 15 by stem 21. The sides of lever 25 are extended as at 29 to abut against a portion of the flexible tube-section 16 diametrically opposite the strip 22 to bend or deflect the lower portion of the tube-section 16. The resilient steel strip 22 prevents upward bending of the upper portion of the flexible tube-section 16, also assists in retracting the casing-sections to their normal axially aligned relation for engagement of valve-member 20 with seat 8 when lever 25 is released.

In some instances, it is desired to lock the valve-assembly to permit flow of fluid therethrough for an extended period. For this purpose, a locking device is provided. This device includes a stem or rod 30 which has its upper end pivoted by a pin 31 to a bracket 32, extends through a slot 33 in lever 25 and is provided at its lower end with an abutment 34. A locking-lever 35 is pivotally connected by pin 36 to lever 25 and is provided with a slot 37 through which the lower portion of rod 30 is slidable. A leaf-spring 38 is secured to the underside of lever 25 and applied to locking-lever 35 for clamping rod 30 between lever 25 and the upper end of slot 37 in lever 35. When lever 25 is moved toward casing-section 5, the spring-urged locking-lever 35 will clamp rod 30 against the rear side of slot 33 in lever 35 and hold lever 25 in its shifted position. Locking-lever 35 is provided with an arm 39 which, when pressed toward lever 25, will release rod 30 and permit lever 25 to return to its normal position for closing the valve. Bracket 32 is secured on casing-section 5 by band 17 which secured the flexible tube-section 16 on nipple 9 and extends through a slot in bracket 32. An eye 40 is formed on the casing-section 11 for convenience in supporting the valve-assembly on a hook when it is not in use.

The operation of the valve will be as follows: normally the valve-member 20 will engage the seat 8, nipples 9 and 15 will be in axial alignment for cutting off the flow of fluid through the assembly. When it is desired to flow fluid through the assembly, the operator will grasp casing-section 5 and grip 28 and squeeze them together. Lever 25 will bend or deflect the lower portion of flexible tube-section 16 inwardly while the resilient strip 22 holds and presses apart the upper portions of casing-sections 5 and 11 and restrains the upward bending of the upper portion of the tube-section 16. The inward flexing of the lower portion of tube-section 16 will produce relative and angular displacement between casing-sections 5 and 11 while valve-member 20 is maintained in fixed relation to casing-section 11 and moves away from its seat 8 to permit the flow of fluid through nipple 9, tube-section 16 and duct 12 in outlet-section 11. The operator may also press the arm 39 to release locking-lever 35 from rod 30, when it is desired to manually hold the valve-assembly during the flow of fluid. If it is desired to retain the valve open for an extended period, the spring-urged locking lever 35 will hold lever 25 into the position in which it is shifted. The volumetric flow of fluid may be readily controlled by the extent of movement of lever 25 relative to casing-section 5.

The invention exemplifies a valve-assembly which comprises separate or relatively movable inlet and outlet casing-sections which are communicatively connected by a flexible tube-section and a valve-seat and closure in one of the sections, which are shifted to control the flow of fluid to the outlet section by bending or deflection of the tube-section. The invention also exemplifies a valve-assembly of this type which is simple in construction and can be economically fabricated. The invention also exemplifies means for locking the casing-sections in relative position to retain the valve open for controlling the flow of fluid for long periods. The assembly can be easily manipulated and is well adapted for portable use.

The invention is not to be understood as limited to the details described, since these may be modified within the scope of the appended claims without departing from the spirit and scope of the invention.

Having thus described the invention, what I claim as new and desire to secure by Letters Patent is:

1. A valve assembly comprising, an inlet casing-section provided with an integral nipple and a fluid passage therethrough, an outlet casing-section provided with an integral nipple and a passage therethrough for fluid, a flexible tube-section having its ends secured to and extending between and communicatively connecting the casing-sections for relative movement, a valve-seat and a closure member in the inlet casing-section, a stem of substantially fixed length and fixed to the closure member and connected to the remote casing-section and of sufficient rigidity to force the closure from its seat, means including a lever rigidly connected with the outlet section for deflecting the flexible tube-section and relatively moving the casing-sections and relatively moving the valve-seat and the closure member to control the flow of fluid through the assembly, a rod between the lever and the inlet casing-section, and a locking-lever engaging said rod and mounted on the lever fixed to the outlet casing-section.

2. A valve assembly comprising: an inlet casing section provided with an integral nipple and a fluid passage therethrough, an outlet casing section provided with an integral nipple and a passage therethrough for fluid, a flexible tube-section having its ends fitting around said nipples, respectively, bands for securing the ends of the flexible tube-section around said nipples, a valve seat and a closure member in the inlet casing section, a stem for said closure member of substantially fixed length and fixed to the closure member and connected to the remote casing section and of sufficient rigidity to force the closure from its seat, a normally and substantially straight resilient strip extending along one side of the flexible tube section and having its ends secured in said bands, and a lever rigidly connected to the outlet section for deflecting the flexible tube section and relatively moving the casing sections and relatively moving the valve seat and the closure member to control the flow of fluid through the assembly.

3. A valve assembly comprising: an inlet casing section provided with an integral nipple and a fluid passage therethrough, an outlet casing section provided with an integral nipple and a passage therethrough for fluid, a flexible tube-section having its ends fitting around said nipples, respectively, bands for securing the ends of the flexible tube-section around said nipples, a valve seat and a closure member in the inlet casing section, a stem for said closure member of substantially fixed length and fixed to the closure member and connected to the remote casing section and of sufficient rigidity to force the closure from its seat, a normally and substantially straight resilient strip extending along one side of the flexible tube-section and having its ends secured in said bands, and a lever rigidly connected to the outlet section for deflecting the flexible tube-section and relatively moving the casing sections and relatively moving the valve seat and the closure member to control the flow of fluid through the assembly, said deflecting lever being disposed on the side of the flexible tube opposite the flat strip.

4. A valve assembly comprising: an inlet casing section provided with an integral nipple and a fluid passage therethrough, an outlet casing section provided with an integral nipple and a passage therethrough for fluid, a flexible tube-section having its ends fitting around said nipples, respectively, bands for securing the ends of the flexible tube-section around said nipples, a valve seat and a closure member in the inlet casing section, a stem for said closure member of substantially fixed length and fixed to the closure member and having a hook connection with the nipple of the remote casing section and of sufficient rigidity to force the closure from its seat, a resilient strip extending along the side of the flexible tube-section and having its ends secured in said bands, and a lever rigidly connected to the outlet section for deflecting the flexible tube-section and relatively moving the casing sections and relatively moving the valve seat and the closure member to control the flow of fluid through the assembly.

WILLIAM H. PECK.

REFERENCES CITED

The following references are of record in the file of this patent:

UNITED STATES PATENTS

| Number | Name | Date |
| --- | --- | --- |
| 724,257 | Burton | Mar. 31, 1903 |
| 1,069,429 | Jackson | Aug. 5, 1913 |
| 2,149,584 | Davis | Mar. 7, 1939 |

FOREIGN PATENTS

| Number | Country | Date |
| --- | --- | --- |
| 13,626 | Great Britain | of 1892 |
| 853,248 | France | of 1939 |